(12) United States Patent
Nair et al.

(10) Patent No.: US 7,340,089 B2
(45) Date of Patent: Mar. 4, 2008

(54) GEOMETRIC PATTERN MATCHING USING DYNAMIC FEATURE COMBINATIONS

(75) Inventors: Dinesh Nair, Austin, TX (US);
Matthew S. Fisher, Austin, TX (US);
Satish V. Kumar, Austin, TX (US);
Bruce Smyth, Hollis, NH (US);
Subramanian Ramamoorthy, Austin, TX (US)

(73) Assignee: National Instruments Corporation, Austin, TX (US)

( * ) Notice: Subject to any disclaimer, the term of this patent is extended or adjusted under 35 U.S.C. 154(b) by 557 days.

(21) Appl. No.: 11/032,423

(22) Filed: Jan. 10, 2005

(65) Prior Publication Data

US 2006/0039601 A1     Feb. 23, 2006

Related U.S. Application Data

(60) Provisional application No. 60/602,203, filed on Aug. 17, 2004.

(51) Int. Cl.
*G06K 9/62* (2006.01)

(52) U.S. Cl. .................. 382/159; 382/199; 382/203; 382/209; 706/20; 706/25

(58) Field of Classification Search ............... 382/103, 382/156, 209, 217, 159; 706/20, 25
See application file for complete search history.

(56) References Cited

U.S. PATENT DOCUMENTS

| | | | |
|---|---|---|---|
| 5,995,652 A * | 11/1999 | Chiu et al. ............... 382/159 |
| 6,018,728 A * | 1/2000 | Spence et al. ............ 706/20 |
| 6,175,644 B1 | 1/2001 | Scola et al. |
| 6,324,532 B1 * | 11/2001 | Spence et al. ............ 706/27 |
| 6,381,366 B1 | 4/2002 | Taycher et al. |
| 6,571,006 B1 | 5/2003 | Montillo et al. |
| 6,650,779 B2 * | 11/2003 | Vachtesvanos et al. ..... 382/228 |
| 6,678,394 B1 * | 1/2004 | Nichani .................... 382/103 |
| 6,687,402 B1 | 2/2004 | Taycher et al. |
| 6,798,925 B1 * | 9/2004 | Wagman .................. 382/287 |
| 6,807,305 B2 | 10/2004 | Rajagopal et al. |
| 6,836,567 B1 | 12/2004 | Silver et al. |
| 6,915,010 B2 * | 7/2005 | Neubauer et al. ......... 382/206 |
| 6,941,016 B1 | 9/2005 | Wagman et al. |

(Continued)

OTHER PUBLICATIONS

Arthur R. Pope and David G. Lowe; "Learning Object Recognition Models from Images"; Fourth International Conference on Computer Vision; May 1993; pp. 296-301.

*Primary Examiner*—Gregory M Desire
(74) *Attorney, Agent, or Firm*—Meyertons Hood Kivlin Kowert & Goetzel, P.C.; Jeffrey C. Hood

(57) ABSTRACT

A geometric pattern matching method to locate instances of a template image in a target image using a plurality of models with different feature combinations. A learning phase involves learning geometric information about the template image and creating a model for each of a plurality of different respective parent features. Each model comprises a relationship tree from the respective parent feature to one or more other child features, and hence each model may have different feature combinations. In a matching phase, the method may examine a plurality of different models to determine matches in the target image being analyzed. The matching phase may select different models dynamically based on prior matching results.

24 Claims, 12 Drawing Sheets

U.S. PATENT DOCUMENTS

| | | |
|---|---|---|
| 6,944,331 B2 | 9/2005 | Schmidt et al. |
| 6,944,341 B2 * | 9/2005 | Loce et al. ................ 382/209 |
| 7,158,677 B2 * | 1/2007 | Wenzel et al. ............. 382/203 |
| 7,162,073 B1 * | 1/2007 | Akgul et al. ................ 382/149 |
| 2002/0037105 A1 * | 3/2002 | Michael ..................... 382/203 |
| 2002/0054694 A1 * | 5/2002 | Vachtsevanos et al. ..... 382/111 |
| 2003/0174891 A1 | 9/2003 | Wenzel et al. |
| 2003/0194133 A1 | 10/2003 | Wenzel et al. |
| 2003/0194135 A1 | 10/2003 | Wenzel |
| 2003/0198388 A1 | 10/2003 | Wenzel et al. |
| 2004/0247181 A1 | 12/2004 | Wenzel et al. |
| 2006/0039601 A1 * | 2/2006 | Nair et al. .................. 382/159 |
| 2007/0116365 A1 * | 5/2007 | Kloer ......................... 382/190 |

* cited by examiner

Pattern Matching

Pattern Matching With Characterization Of The Template Image

Match Phase

Matching Under Occlusion

Matching Under Occlusion
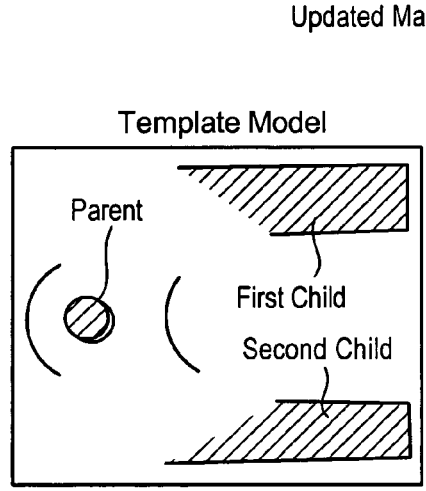
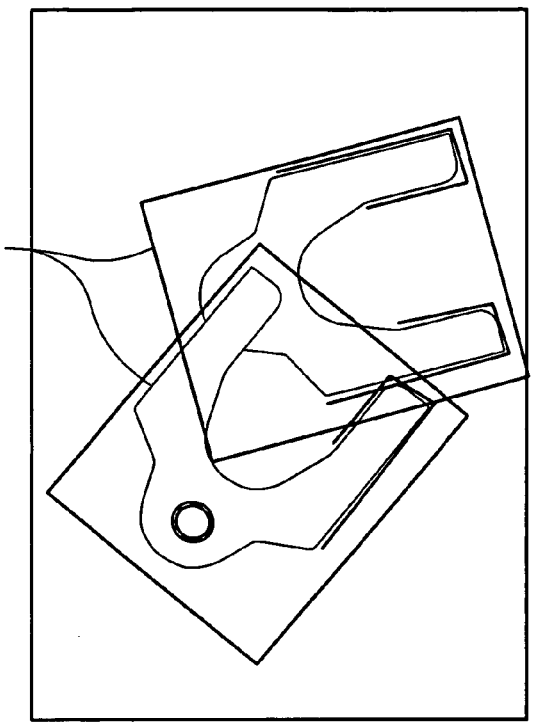
Fig. 21
Fig. 22

GEOMETRIC PATTERN MATCHING USING DYNAMIC FEATURE COMBINATIONS

PRIORITY CLAIM

This application claims priority to U.S. provisional application Ser. No. 60/602,203 filed Aug. 17, 2004, titled "Geometric Pattern Matching Using Dynamic Feature Combinations".

FIELD OF THE INVENTION

The present invention relates to improved methods for performing pattern matching to locate one or more instances of a template image in a target image. More specifically, the invention includes a method for performing pattern matching using a plurality of pattern matching techniques.

DESCRIPTION OF THE RELATED ART

In many applications it is necessary or desired to find one or more instances of a template image, image object, or pattern in a target image. Such applications include machine vision applications for manufacturing test, inspection, process monitoring, feedback control, and laboratory automation; image and video compression; and jitter compensation in video cameras, among others.

Prior art pattern recognition systems have typically used a pattern matching algorithm to find locations of a grayscale image that match a predefined template. FIG. 1 illustrates the pattern matching problem as known in the prior art. As shown, the pattern matching problem involves a template image, wherein one or more instances of the template image are desired to be located in the target image. The template image and the target image are provided to a pattern matching algorithm which performs the pattern matching. The pattern matching algorithm may determine locations of the template in the target image, the quality of the match, the orientation of the template, and the size of the template. For example, the pattern matching algorithm may calculate score(s) for each matching region, where the scores indicates quality of match. The pattern matching algorithm also may return the XY coordinates, rotation angle, scale, and occlusions for each match.

Pattern matching provides information about the presence or absence, number, and location of the template or model within an image. For example, an image containing a printed circuit board can be searched for one or more alignment marks, which are called fiducials. The positions of the fiducials are used to align the board for placement of the chips by a chip mounting device. Pattern matching can also be used to locate key components in gauging applications. In gauging applications, pattern matching locates key components and then "gauges" the distance or angle between these objects. If the measurement falls within a tolerance range, the part is considered good. If it falls outside the tolerance, the component is rejected. In many applications, searching and finding a feature is the key processing task that determines the success of the application.

Generally, prior to performing the pattern matching algorithm, the pattern or template image may be characterized. FIG. 2 illustrates the pattern matching process of the prior art which involves characterization of the template image to extract features from the template image. In other words, the template is characterized to represent the template image with a lesser amount of data. The characterized template image or model is then used to compare with the target image. This reduces the amount of time and processing required to perform the pattern matching.

Thus, pattern matching has traditionally been a two step process. First, the algorithm "learns" the template by extracting information useful for uniquely characterizing the pattern, and organizing the information to facilitate faster search of the pattern in the image. After the template image has been "learned" or "characterized", step 2 involves performing the actual match. In the match phase, ●information present in the template is used to locate regions that match the template. In general, in step 2 the emphasis is on search methods that quickly locate matched regions.

One type of pattern matching is referred to as correlation based pattern matching. Correlation based pattern matching is a template matching technique wherein the stored image or pattern to be located, referred to as the template, is iteratively compared with various corresponding portions of an image in which it is desired to locate the template, referred to as the target image. A correlation based pattern matching algorithm generally operates to compare the pixels in the template image, or a selected subset of sample pixels, against each of the possible various locations in the target image. Typically, the pattern matching algorithm involves comparing the template image, or a subset of sample pixels representing the template image, against locations in the target image on a horizontal pixel column basis and horizontal scan line basis. In other words, the sample pixels representing the template image are compared against a portion of the pixels in the target image, such as by using a 2D correlation, the sample pixels representing the template are then moved down or across a one pixel scan line or one pixel column in the target image, and the pattern matching algorithm is repeated, etc. Thus, the pattern matching algorithm generally involves comparing the template image pixels against all possible locations in the target image in an iterative fashion. The pattern matching produces the location of the template in the image, the quality of match and possibly the orientation, size and/or scaling of the template.

As described above, prior to performing the pattern matching algorithm, the pattern or template image may be characterized. In correlation based pattern matching, the template image may be characterized by sampling a number of points or pixels, referred to as sample pixels, which presumably accurately characterize the template image. The template image is characterized in this fashion because the time required for the pattern matching is generally directly proportional to the number of points or pixels representing the template image which are used in the pattern matching. Thus the template is characterized to reduce the number of samples or pixels which are used in the correlation operation, thereby reducing the amount of computation. Once a lesser number of sample pixels have been generated, these sample pixels are then used in the pattern matching algorithm to locate instances of the template image in the target image.

The template is compared with portions of the target image, for example, by utilizing a correlation based pattern matching, i.e., using normalized two dimensional correlation (normalized 2D correlation). This 2D correlation is performed by placing the template over the respective portion of the image and performing a normalized 2D correlation between the pixels in the template and the pixels in the corresponding portion of the image. This correlation generally produces a correlation value which indicates the degree of correlation or match. For example, the correlation value may range between −1 and +1, wherein +1 indicates a complete match, 0 indicates no match, i.e., that the two images are uncorrelated, and −1 indicates that the two images are anti-correlated, i.e., a complete reversal of a match.

Another type of pattern matching algorithm is geometric pattern matching. In geometric pattern matching, particular geometric features of the template image are detected and characterized. The various geometric features may then be assembled into a model that describes the template image. When the target image is received, geometric features from the model are extracted from the target image to determine if the template image is present in the target image.

Geometric pattern matching can provide improvements over correlation based pattern matching in many applications. However, current geometric pattern matching algorithms still encounter difficulty in finding objects of interest. Therefore, improved geometric pattern matching methods are desired.

SUMMARY OF THE INVENTION

The present invention comprises various embodiments of a system and method for performing geometric pattern matching to locate zero or more instances of a template image in a target image. The pattern matching is preferably performed by one or more programs executing in a computer system. The target image is preferably acquired by the system, such as by a camera, and provided to the computer system for the pattern matching.

The pattern matching system and method of the present invention may be used in a variety of applications, such as, for example, a machine vision system. The machine vision system preferably comprises a host computer and a video source, e.g., a camera, which preferably produces a video signal comprising an image or a sequence of images or video frames, or other data desired to be acquired. The video signal is provided through a wire or cabling to the host computer for storage and/or processing. The host computer includes various standard components, such as at least one CPU, memory, etc.

In one embodiment, the method for detecting patterns in an image comprises a learning phase and a match phase. The learning phase involves learning geometric information about the template image, i.e., the image comprising the object(s) that is desired to be located in a target image. The match phase involves searching a stored or acquired or synthesized target image to find instances of the template image or template image object(s) in the target image.

In the learning phase, the method comprises accessing a template image, such as from a memory medium, and then determining a plurality of geometric features present in the template image. The learning phase then creates a model for each of a plurality of respective parent features, wherein each model comprises a relationship tree from the respective parent feature to one or more other child features.

Features are selected to be parent features based on determined strengths of the features. In one embodiment, the geometric features found in the template image are sorted from strongest to weakest. Stronger features are those that have a greater ability to distinguish and/or identify the template image. The strength of a features is determined at least partially based on: 1) the geometry of the feature; 2) how well the feature was found in the image; and 3) the size of the feature.

Each model preferably comprises a data structure comprising information on parent feature and information on the relationship to one or more child features. The child features may be stored in a hierarchical fashion. It is noted that the order of the child features may be different for different respective parent features. Also, parent features may be child features in other models. The plurality of models created in the learning phase may be ordered based on the relative strengths of the respective parent features in the respective models.

In the matching phase, a target image may be acquired or otherwise stored. In the matching phase, the method preferably starts with the model having the strongest parent feature. The matching phase may first extract first geometric features from the target image that correspond to a parent feature in a first model (as noted above, preferably the model having the strongest parent feature). In one embodiment, the geometric features from the target image may be extracted before the match phase, and these extracted target geometric features may be provided to the match phase.

The method then matches the first parent feature to the first geometric features extracted from the target image to determine one or more matches. For each determined match, the method may create and store information in a match data structure regarding the position, orientation, scale, % occlusion of the match, the types of features and their spatial relationships that comprise the match, and the score. The match data structure may also store other information or parameters.

The method may then extract second geometric features from the target image that correspond to the next child feature (the first child feature in the hierarchy) in the first model, and match this child feature to the second geometric features from the target image. Where this child feature matches any of the second geometric features from the target image, the method updates respective match data structures accordingly. The method may continue to extract geometric features, perform matching, and update matches for each of a plurality of child features in the model. Stronger features may be used in updating respective one or more matches, while less strong features may be used in updating a score of respective one or more matches.

If geometric features of a child feature are not found in the target image, or if geometric features found for a child feature do not update any existing matches, then the method may select a new model that is based on a second different parent feature. The second different parent feature may be the next strongest feature in the ordering of parent features. This next strongest feature may be a previously unidentified feature. Alternatively, the second different parent feature may be a previously identified child feature of the first model. Other methods may also be used in selecting the new model, e.g., selecting the new parent feature that determines the new model. Where a new model is selected, the method may repeat the above steps of extracting geometric features of the new parent, performing matching, extracting geometric features of child features in the new model, updating matches, and so on. Where the parent feature of the new model is a child feature of a previous model, this parent feature will already have been extracted from the target image, and hence no new extraction of this parent feature is required. Where a new model is used, the method may update pre-existing matches or create new matches as needed.

The above steps in the matching phase may repeat one or more times for different respective models until all matches have been found or a predetermined time limit expires. Upon completion, the method may then calculate a score for each match, using information in the respective match data structure(s). In one embodiment, those matches with scores that exceed a threshold are determined to be final matches. The method may then store information in a memory medium regarding final matches, or may output information to a user regarding the determined final matches.

BRIEF DESCRIPTION OF THE DRAWINGS

A better understanding of the present invention can be obtained when the following detailed description of the preferred embodiment is considered in conjunction with the following drawings, in which:

FIG. 21 illustrates a template model having a parent feature and first and second child features, where the second child feature is the leg in the lower right hand portion of the alignment shim; and FIG. 22 shows the updated matches for each of the lower and upper instances of the alignment shim in the target image.

DETAILED DESCRIPTION OF THE PREFERRED EMBODIMENT

The present invention comprises various embodiments of a system and method for performing geometric pattern matching using dynamic feature combinations. The pattern matching system and method of the present invention may be used in a number of different applications including various types of machine vision systems, e.g., industrial automation, robotic vision, manufacturing inspection, or traffic analysis, and image or video compression, such as MPEG compression, among others.

As used herein, the term "pattern" refers to an image or a portion of an image that is desired to be located in a target or acquired image. The term "pattern" may also refer to a characteristic of an image or image portion. The term "model" refers to a characterization of features contained in a template image.

Figure 1:
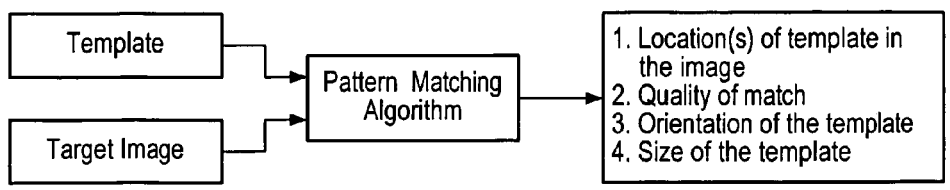
FIG. 1 illustrates pattern matching as performed in the prior art.
Figure 2:
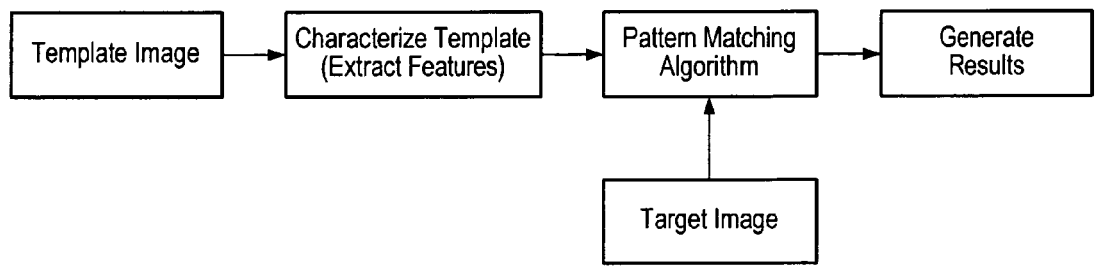
FIG. 2 illustrates pattern matching performed in the prior art.
Figure 3:
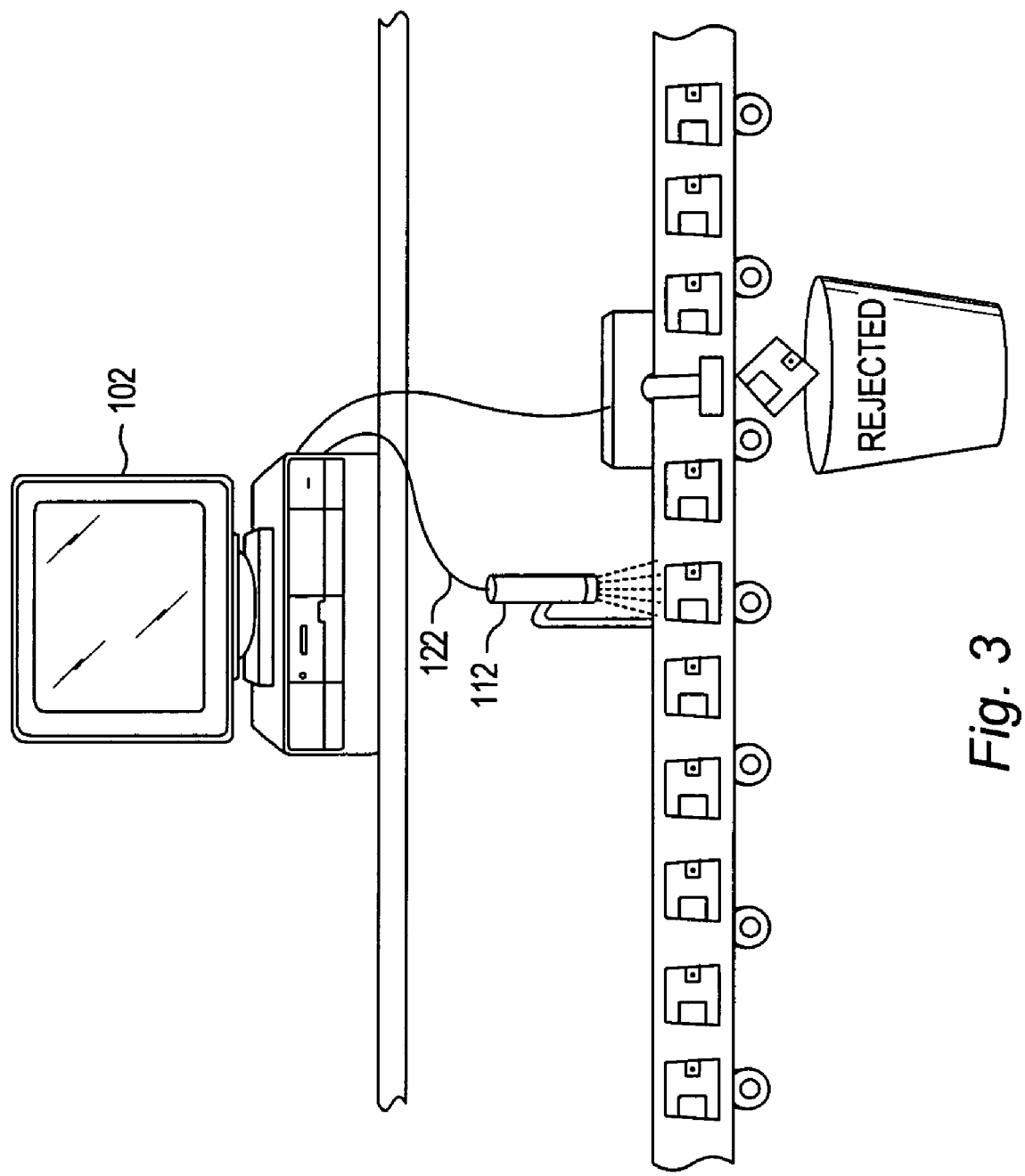
FIG. 3 illustrates a machine vision system according to one embodiment of the present invention.

FIG. 3—Machine Vision System

FIG. 3 illustrates an example of a machine vision application wherein the pattern matching system and method of the present invention may be used. The machine vision system may comprise a host computer 102 and a video source 112. The video source may be an analog or digital camera. The video source 112 preferably produces a digital video signal which comprises an image or a sequence of images or video frames, or other data desired to be acquired. The digital video signal may be provided through a wire or cabling 122 to the host computer 102 for storage and/or processing. The host computer may include an image acquisition or frame grabber board (also called a video capture board). The host computer 102 preferably includes various standard components, such as at least one CPU, memory, etc.

The host computer 102 may store a template image or pattern. In one embodiment, the host computer 102 may also store software which performs pattern matching to locate zero or more instances of the template image in the target image. According to one embodiment of the present invention, the software is executable to perform geometric pattern matching using a plurality of different models having different feature combinations. The different feature combinations may be intelligently and dynamically selected "on-the-fly" during the matching phase, as will be described below.

In the embodiment of FIG. 3, the host computer 102 may receive the target image from the video source 112 and perform pattern matching using the stored template image. However, in other embodiments, the computer 102 may receive the target image and/or the template image from another source, or one or both of the target image and the template image may be pre-stored on the computer.

FIG. 3 illustrates a machine vision application, where the computer system 102 is coupled to a camera 112 and operates to receive a target image and perform pattern matching to locate one or more instances of a template image in the target image. The computer system of FIG. 3 is programmed according to one embodiment of the present invention to apply a geometric pattern matching technique using dynamic feature combinations to the target image to detect and locate the template image in the target image. The pattern matching and/or image characterization techniques of the present invention may be used in various types of machine vision applications. For example, the computer 102 may be embodied in various form factors and/or architectures, e.g., a robot, among others. It is also noted that the pattern matching and/or image characterization techniques described herein may be performed in any of various manners, either in software, programmable logic, or hardware, or a combination thereof.

Figure 4:
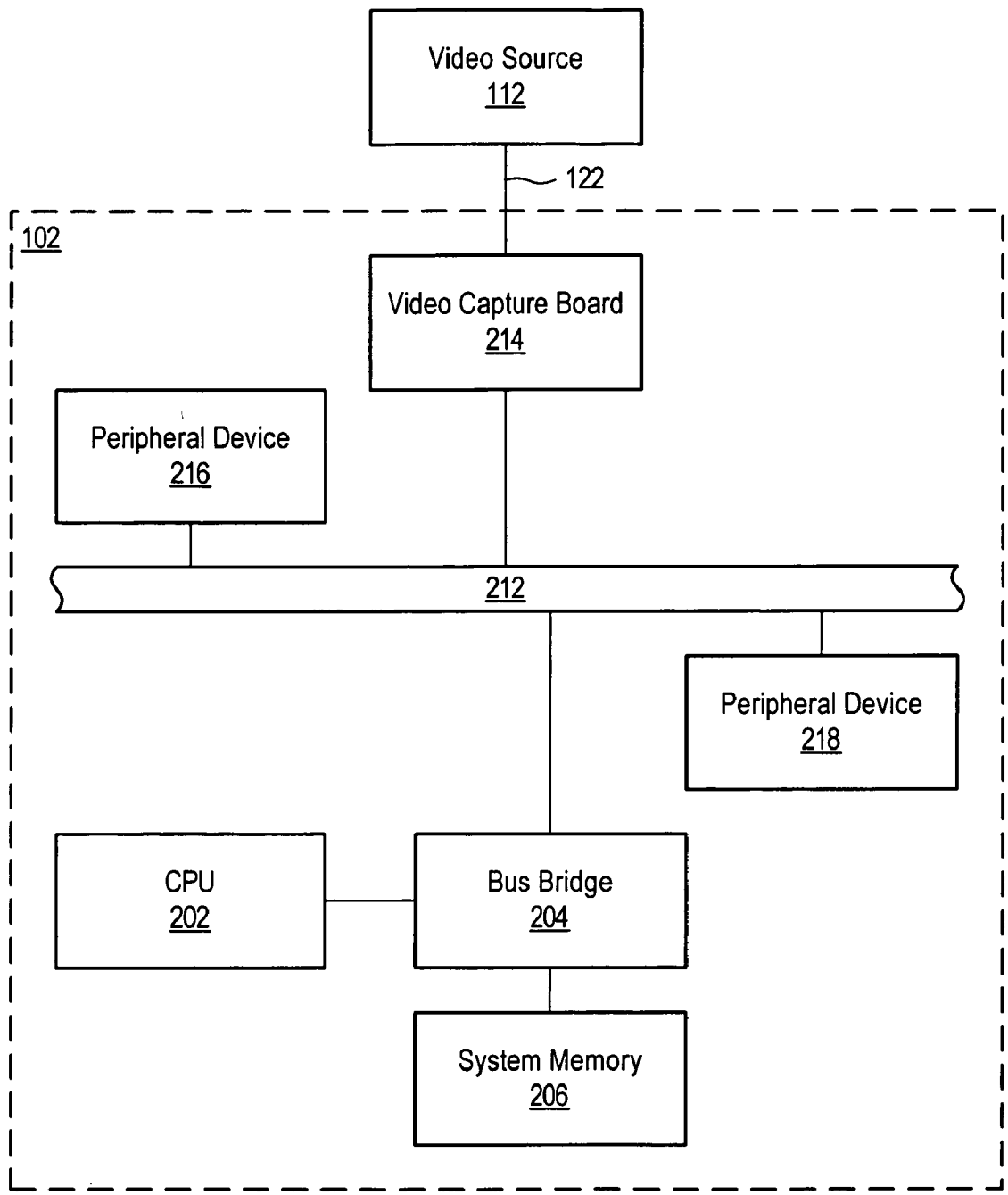
FIG. 4 is a high-level block diagram of the machine vision system.

FIG. 4—Video Capture System Block Diagram

FIG. 4 is a high-level block diagram of the video capture system of FIG. 3. It is noted that the block diagram of FIG. 4 is exemplary only, and other computer system architectures may be used as desired. For example, embodiments of the present invention may be implemented in a "smart camera", for example, which integrates a sensor, analog to digital (A/D) converter, CPU and communications devices together in a single unit. Embodiments of the present invention may be embodied in other architectures or embodiments, as desired.

As shown in FIG. 4, the host computer 102 preferably comprises a CPU 202, a Bus Bridge 204, system memory 206, and a peripheral bus 212. The CPU 202 is coupled to the Bus Bridge 204. The Bus Bridge 204 is coupled to the system memory 206 and the CPU 202, and couples to the peripheral bus 212. The peripheral bus 212 may be the PCI or PCI Express expansion bus, although that other types of buses may be used.

In this embodiment, the host computer system 102 also includes a video capture board 214 which is adapted for coupling to the video source 112. The video capture board 214 is preferably coupled to the peripheral bus 212. In addition to the video capture board 214, other peripheral devices (216 and 218) may be coupled to the peripheral bus 212, such as audio cards, modems, graphics cards, network cards, etc.

The video source 112 supplies the video signals to the video capture board 214. The video capture board 214 transfers the digitized video frames to the system memory 206 through peripheral bus 212 and Bus Bridge 204. In this embodiment, the video capture board 214 acquires the target image and transfers the target image to system memory 206. Thus, the computer system 102 includes an input which is operable to receive image data.

The system memory 206 preferably stores a template image or pattern. The system memory 206 also preferably stores software according to one embodiment of the present invention which operates to use a geometric pattern matching technique as described herein to detect and locate instances of the pattern in the target image.

Embodiments of the present invention are preferably implemented in one or more software programs which are executable by one or more processors or CPUs. The software program(s) of the present invention are preferably stored in a memory medium. As used herein, the term "memory medium" is intended to include an installation media, e.g., a CD-ROM, DVD, or floppy disks, a computer system memory such as DRAM, SRAM, EDO RAM, etc., or a non-volatile memory such as a magnetic medium, e.g., a hard drive, or optical storage, among other types of memory.

In another embodiment, the methods presented herein may be performed by programmable hardware, such as a field programmable gate array (FPGA). In other embodiments, the methods may be performed by a combination of one or more processors and one or more programmable hardware elements.

Figure 5:
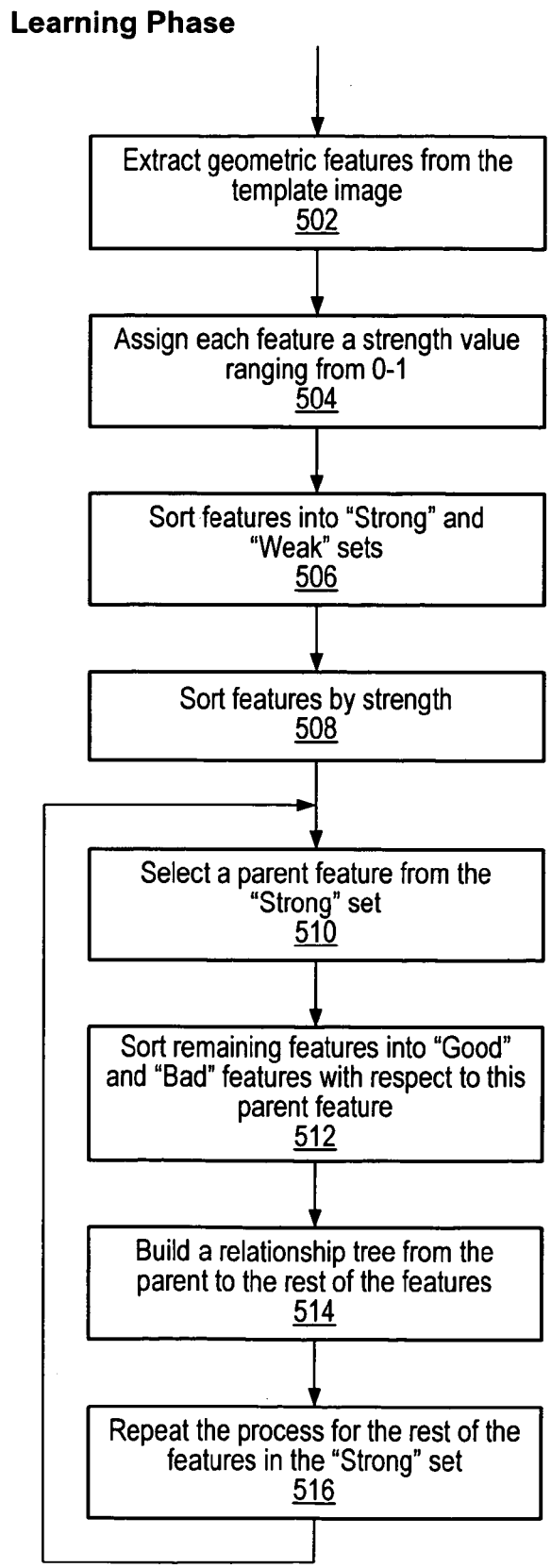
FIG. 5 is a flowchart diagram illustrating an embodiment of the "learn template" phase of a geometric pattern matching method according to one embodiment of the present invention.

FIG. 5—Pattern Matching Flowchart: Template Learning Phase

FIG. 5 is a flowchart diagram illustrating a method for a first template learning phase for performing geometric pattern matching according to one embodiment of the present invention. It is noted that in various embodiments, some of the steps may be performed in a different order than shown or may be omitted, as desired. Additional steps may also be performed.

As shown, in 502 the method extracts geometric features from the template image. Geometric features may comprise 2-dimensional shapes (such as circles, rectangles, legs, etc.), linear primitives (such as lines, parallel lines, curves of constant curvature, etc.), corners, curves, etc. Exemplary geometric features are shown in FIG. 7A. Here a software program may analyze the image to determine geometric features present in the template image. This may be accomplished using any of various known techniques.

In one embodiment, features are extracted using a sequence of steps:

1. Contour Extraction: First edge points in the image are detected. These edge points are then chained together to form contours (curves). These curves typically represent the boundary of the part in the image that is being learned. Some contours may be immediately filtered based on size, energy etc.

2. Polyline Extraction: Each curve extracted from the image is then represented using polylines. During this process the curve is split into multiple segments, where each segment is represented using a line. The points where the lines segments, which make up a curve, meet are corner points (points where the curve makes a turn). In this manner, each curve is represented by a piecewise linear function. (Note: The function does not have to be linear, we could have chosen polynomial, spline, etc. This would have made the extraction of parallel lines and corners more difficult to extract, but made the extraction of constant curves and circles easier to extract.)

3. Corner Extraction: From the polyline representation of the curves, corners can be extracted. Corners are the points at which the polyline segments of the curve meet. The angle at each corner point is then calculated, where the angle is made at the intersection of the two lines that make up the corner. Once the angle is calculated the corner is classified into one of many corner types. For example, seven corner types may be used: 0, 22.5 degrees, 45 degrees, 67.5 degrees, 90 degrees, 112.5 degrees, 135 degrees, and 157.5 degrees. In one embodiment, all corners at which the angle is between 22.5 ±11.25 degrees are classified as 22.5 degree corners and so on. Classifying corners like this helps searching for corners in the inspection image quicker. During a coarse search step the method can look for certain corner types. Once matching corners have been found, the match can be refined by using the actual corner angle measures.

4. Feature Extraction: The corner points, polyline segments and the original points on each curve are used to extract geometric features from the curves. Each feature is assigned a strength score. In one embodiment the following types of features are extracted:

a. Parallel Line Pairs: Pair of lines in the image that are parallel. These are extracted by comparing the angles of the polylines that have been extracted from the curves. Parallel lines can be extracted from each curve (i.e., use only the polylines within each curve) or by looking across all curves (i.e., use all polylines in the image). The strength score assigned to a parallel line pair is based on the amount of overlap the lines in the pair have with each other and on the aspect ratio of the parallel lines (ratio of distance between the lines to the average length of the line). Parallel lines that have more overlaps between the lines and have aspect ratios less than 1 are favored.

b. Pairs of Parallel Line Pairs: A set of two parallel line pairs that are themselves parallel. This feature will be assigned a strength score.

c. Rectangles: Rectangles are extracted using multiple techniques. Rectangles can be extracted from two parallel line pairs that are perpendicular to each other. They can be extracted using a pair of 90 degree corners that form the corners along the diagonal of a rectangle. The strength score of a rectangle is based on (1) how close the angles of the rectangle are to 90 degrees and (2) the aspect ratio of the rectangle.

d. Legs: Legs are features formed by a parallel line pair feature and a polyline segment on either end of the parallel lines (e.g., an incomplete rectangle). This feature will be assigned a strength score.

e. Circles: Circles are extracted per curve. Circles may be extracted using a two step process. First a circle is fit to the corner points that make up a curve. If the circle that is obtained is a valid fit (good fit), then the original points on the curve are used to refit the circle. The strength score of the circle is based on the error of the fit, the amount of the original points along the curve that actually lie on the circle, and the size of the circle. A circle is represented by the radius of the circle.

f. Ellipses—Are extracted in the same manner as a circle. An ellipse is represented by the length of its major and minor axes and its orientation to the x-axis. This feature will be assigned a strength score.

g. Curves of Constant curvature: These features are curves that fall on circles, but do not form complete circles. Feature extraction involves locating parts of a curve where the curve is relatively smooth (i.e., regions along the curve that do not have any sharp corners). This feature is extracted on a per curve basis. For example, 135 and 157.5 degree corners along a curve are grouped into regions (these corners usually correspond to smooth regions on the curve). A circle fit is applied to these regions to see if the points lie along a circle. If the points do fit a circle, then the original points along the region in the curve are refit with a circle to get a better description of the circle. The strength score of a constant curve is based on the error associated with the circle fit, the size of the resulting circle and the amount of the circle that is covered by the constant curve. A constant curve is represented by the radius of the circle that it fits to and the angles from the center of the fit circle to the start and end points of the curve. These angles are called the start and end angles respectively.

During the match phase, described below, similar features are also extracted from the target or inspection image. During the match phase some "virtual" features may be extracted. For example, "virtual corners" are corners formed by polylines that do not physically touch at a point on a curve, but do intersect at a point outside the curve. Similarly, "virtual rectangles" are formed by parallel lines that do not intersect along a curve, but at points outside the curve. These features are useful in the case of occlusion. Virtual rectangles can also be extracted from a diagonal pair of "virtual" 90 degree corners.

Figure 7B:
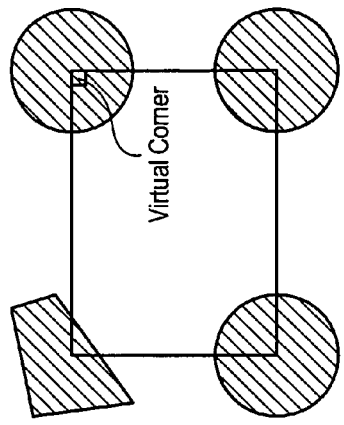
FIG. 7B shows an example of a virtual corner identified in an image.
Figure 7A:
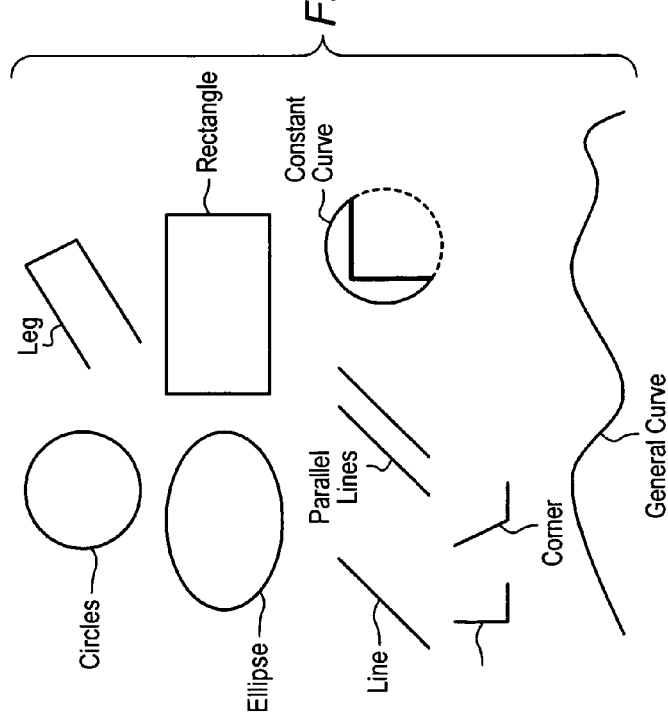
FIG. 7A illustrates exemplary geometric features.

FIG. 7B shows an example of virtual corners. As shown, FIG. 7B includes a rectangle having two corners that are occluded by one or more other objects, in this case circles. Here the method may find the straight line xx and the straight line yy, and infer that, but for the occlusion, these lines should meet to form a virtual corner. In this instance, the method may identify these lines as a "virtual corner", identifying or extracting this virtual corner from the image.

Figure 8:
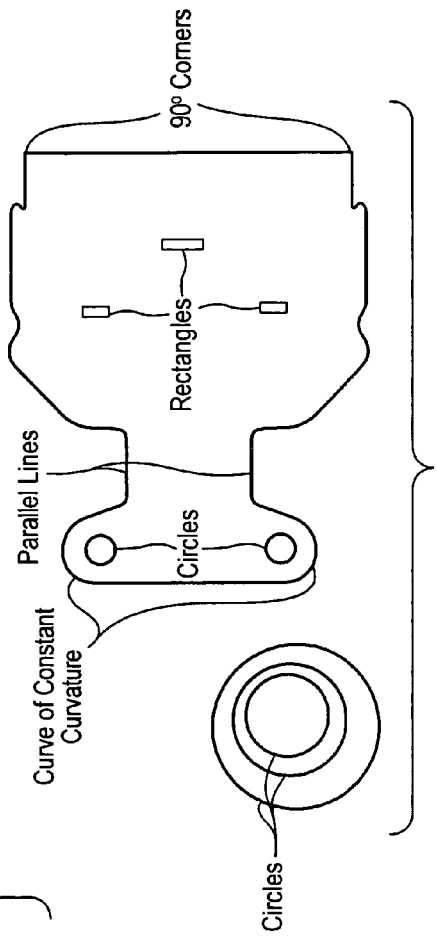
FIG. 8 illustrates an exemplary template image where various features have been extracted.

FIG. 8 illustrates an exemplary template image where various features have been extracted.

In 504, each feature is assigned a strength value, preferably ranging from 0 to 1. The strength value relates to an "importance" of the feature, e.g., the ability of the feature to distinguish or identify the template image. The strength value may be determined based on various criteria. In one embodiment, the strength value for a feature relates to:

1) the nature or geometry of the feature;
2) how well the feature was found in the image, i.e., with what error the feature was found; and
3) the size of the feature.

With respect to the nature or geometry of the feature, different feature types may have higher or lower strengths, depending on how unique or differentiating they may be, e.g., how uncommon they are. For example, circles may have a higher strength value than lines. Within one feature type, different features may have different strengths, depending on size and error. The feature type importance can be defined by the user.

With respect to how well the feature was found in the image, a feature may be classified into one of a subset of types. For example, as discussed above, corners are classified into one of a plurality of corner types, e.g., seven corner types may be used: 0, 22.5, 45, 67.5, 90, 112.5, 135, and 157.5 degrees. In one embodiment, all corners at which the angle is between 22.5+,−11.25 degrees are classified as 22.5 degree corners and so on. The strength score assigned to a corner is at least in part computed as the deviation of the true angle from the angle that it is classified to, i.e., the error. For example a corner that is at 39 degrees will have a lower score than an angle that is at 45 degrees, but both of them will be classified as a 45 degree corner.

With respect to size, larger features may have a higher strength score than smaller features.

Other criteria may be used in determining the strength score, as desired. Also, the above 3 items of geometry, error and size may also be given different weights in determining the strength of the feature.

In 506 the method classifies features into "Strong" and "Weak" sets. In one embodiment, features with strengths greater than a threshold are assigned as "Strong" features, and the remaining features rest are assigned to be "Weak" features. For example, the threshold may be 0.5.

In 508 the method sorts the features by strength. Thus in 508 the method may sort features from strongest to weakest. It is noted that various combinations of 504-508 may be performed together or separately, as desired.

In 510 the method selects a parent feature from the "Strong" set. In one embodiment, the method simply selects the strongest feature as the first parent feature. For example, the order of parent features selected in 510 may also be the order of parent features used in selecting models for the match phase. A parent feature may be selected based on a predetermined order or can be selected by the user, e.g., through a GUI. When a parent feature is selected automatically (programmatically by software), some features types are given more importance in becoming parents than others. For example circles may be given preference over all other features. Similarly, legs may be more important than corners. This preference can be defined by the user. Some features, such as parallel lines, can never become parents in one embodiment.

In 512 the method sorts the remaining features into "Good" and "Bad" features. Thus, after a parent has been selected, the remaining "Strong" features are separated into "Good" and "Bad" features in relation to this parent. A "Good" feature is one that when combined with the parent gives a good estimate of the location, scale, orientation, etc. of the template. A "Bad" feature is one that only serves to improve the confidence in the match provided by the parent. Different parent features may have different "Good" and "Bad" features associated with it.

In 514 the method builds and stores a relationship tree from the parent feature to at least a subset of the rest of the features. Here the method computes the spatial relationships between the parent feature and a subset or all of the remaining features. The method stores the spatial relationships in the form of a tree with the parent as the root. Thus in 514 the method builds a model that represents the spatial relationships between a subset or all the features in the template, as a relationship tree from the parent feature to the rest of the features. The relationship tree may comprise the parent feature and a subset of the remaining features as child features, or may comprise the parent feature and all of the remaining features as child features.

Figure 9A:
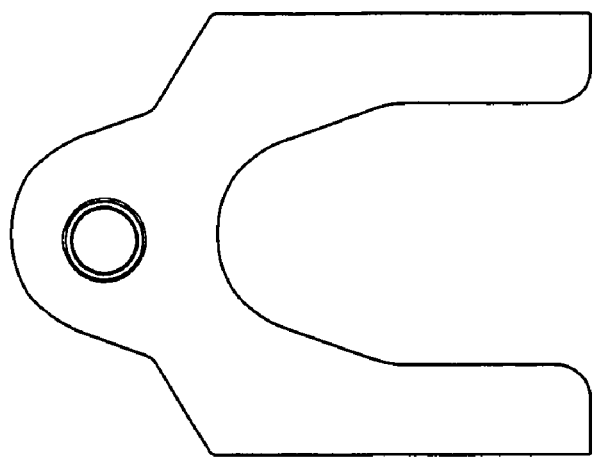
FIG. 9A illustrates an exemplary template image containing an object (an alignment shim)
Figure 9B:
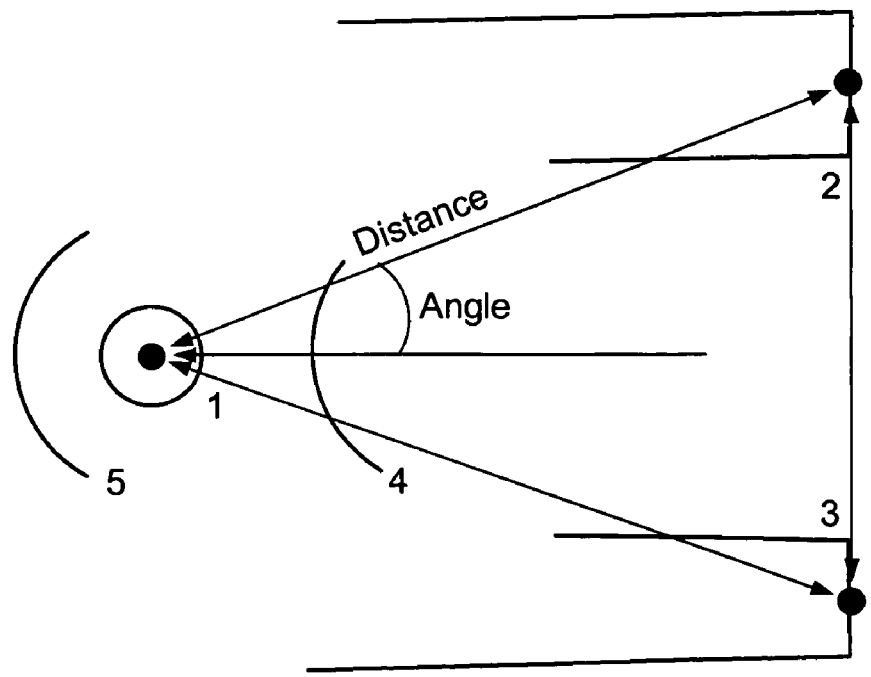
FIG. 9B illustrates a feature relationship model that represents the spatial relationships between the features in the template image object of FIG. 9A, from the perspective of the parent feature, where feature 1 is the parent feature and features 2-5 are child features in the relationship tree hierarchy.

FIG. 9A illustrates an exemplary template image containing an object(an alignment shim), and FIG. 9B illustrates a feature relationship model that has been created that represents the spatial relationships between the features in the template, from the perspective of a parent feature (the circle labeled 1). In FIG. 9B, feature 1 is the parent feature, and features 2-5 are other features (child features) in the relationship tree hierarchy. In embodiment, the tree can be constrained to be a directed acyclic graph. The storage of the relationship tree is not always necessary. The spatial relationships between template features may be computed as needed at run time instead of being stored.

As shown at 516, the method may repeat the above process (510-514) for the rest of the features in the "Strong" set. In other words, at 516 the method may repeat the above process for each of a plurality of "Strong" features that can become parent features. After steps 510-514 have been performed a plurality of times, the information generated, which may comprise the relationship trees or models for various parent features, may be stored in memory for later use. This information is stored for use later in the matching step. Thus the learning method has essentially created a plurality of different models that represent the spatial relationships between a subset or all of the features in the template, for each of a plurality of different parent features. Stated another way, the learning method has essentially created different feature relationship models, wherein each feature relationship model was developed from the perspective of a different parent feature.

As noted above, FIG. 9B shows a model with a parent feature 1 and features 2-5 which are child features of the parent. In the model of FIG. 9B, features 2-5 are ordered hierarchically 2, 3, 4, 5 under parent feature 1. For a different model created for a different parent feature, the child features may be (and typically will be) different and may have a different order. For example, for a model where feature 2 is the parent feature, the child features may be different and have a different order, e.g., may be ordered 5, 3, 4, 1. Thus each model or relationship tree may have a different parent feature, followed by a different respective ordering of child features in a hierarchy under the parent. In some embodiments, a plurality of models may be created each with the same parent feature, but with different sets (or hierarchies) of child features.

Figure 6:
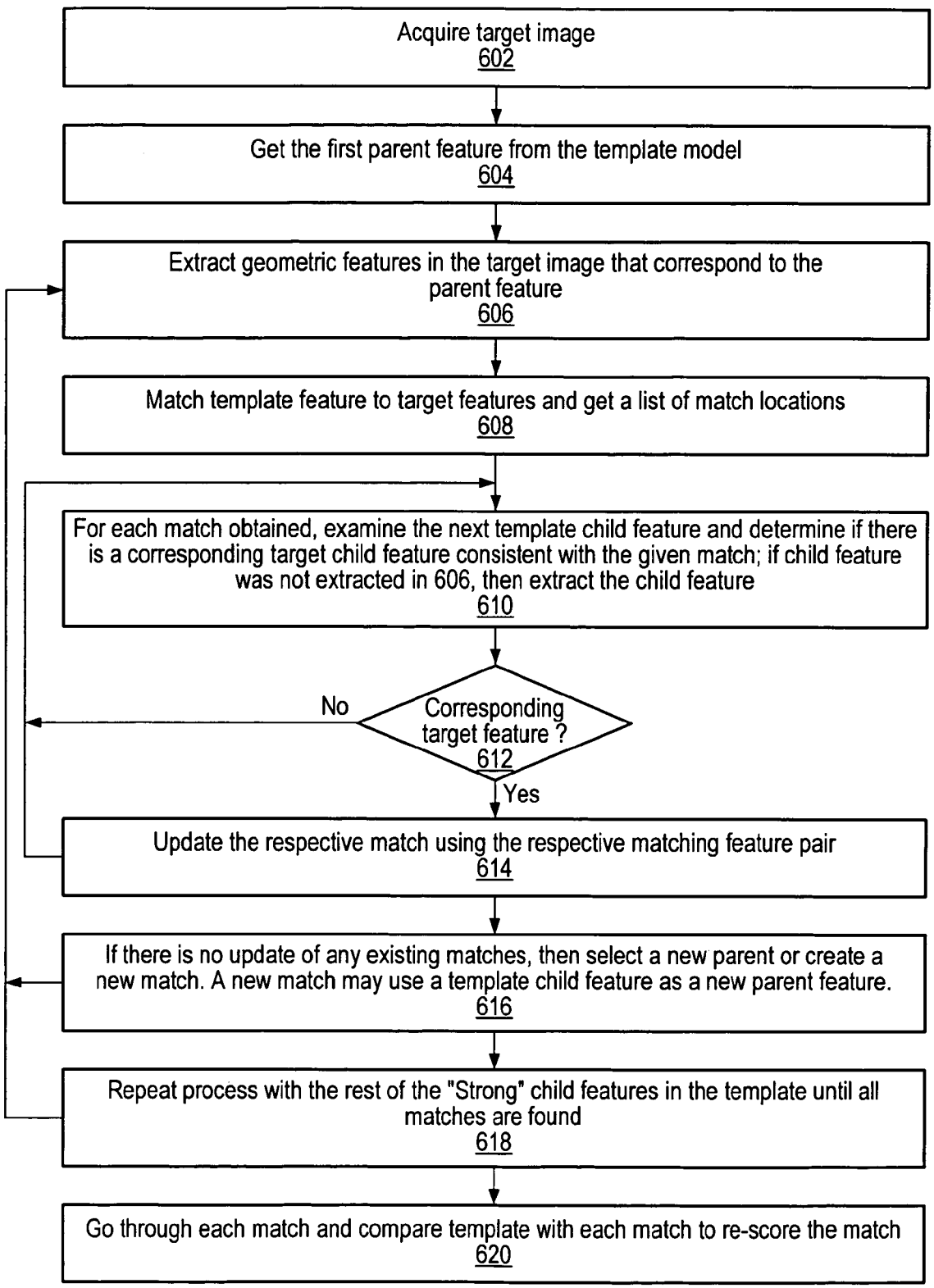
FIG. 6 is a flowchart diagram illustrating an embodiment of the "match" phase of a geometric pattern matching method according to one embodiment of the present invention.

FIG. 6—Pattern Matching Flowchart: Matching Phase

FIG. 6 is a flowchart diagram illustrating a method for a second matching phase for performing geometric pattern matching according to one embodiment of the present invention. It is noted that in various embodiments, some of the steps may be performed in a different order than shown or may be omitted, as desired. Additional steps may also be performed.

Figure 10:
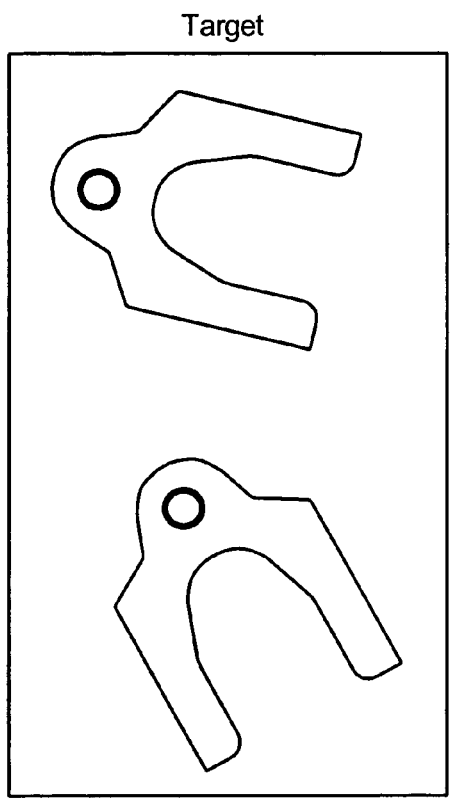
FIG. 10 illustrates an exemplary acquired target image that contains two instances of the template image object of FIG. 9A.

As shown, in 602 the image, i.e., the target image, may be received by and/or stored in the computer system. The image may be received from any of various sources, as desired, including an image source coupled to the computer system over a network. It is noted that in other embodiments, the image may already be present in the computer system, and thus step 602 may be omitted. As described above, in the preferred embodiment, a characterization of the template image described in FIG. 5 may be already stored in the computer system, although in other embodiments the pattern or template image may be received prior to or after reception of the target image. FIG. 10 illustrates an exemplary acquired target image. As shown, the acquired target image contains two instances of the template image object (alignment shim) of FIG. 9A.

Figure 11:
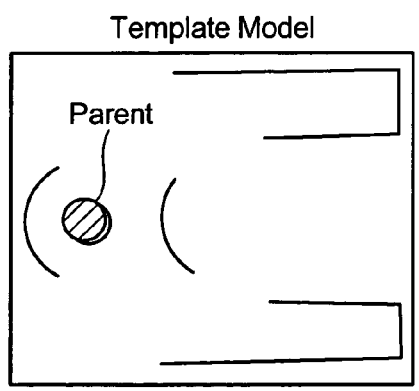
FIG. 11 illustrates an example where a circle is the parent feature.

In 604 the method obtains a first parent feature from a first template model. As one example, to illustrate one possible operation of the method, assume that a circle is the parent feature, as shown in the example of FIG. 11. In 604, the method may select models that have parent features in the order determined in 510 of FIG. 5. Thus the method in 604 may select the first template model that has the strongest parent feature, or which is the strongest overall model.

In 606 the method extracts geometric features in the target image that correspond to the parent feature. Step 606 involves determining geometric features in the target image that correspond to the parent feature. In the assumed example, the method extracts all circles in the inspection image. Geometric features may be extracted as described above with respect to 502 of FIG. 5.

Figure 12:
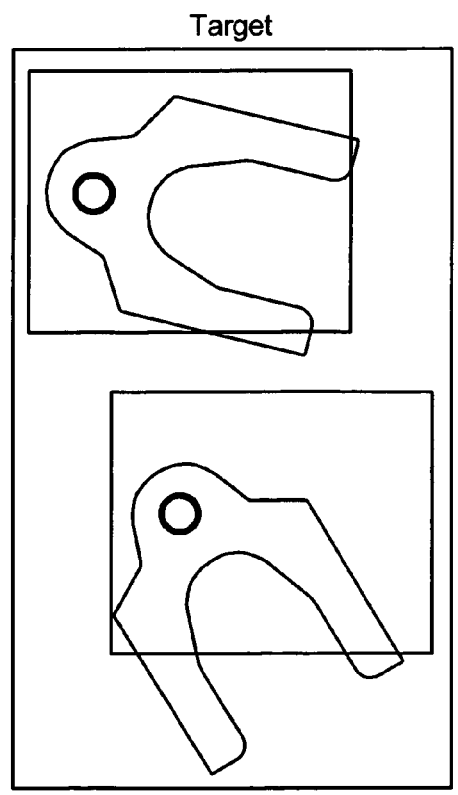
FIG. 12 illustrates an example where the method has found two instances of the parent feature in the target image.

In 608 the method matches the parent template feature to target features to obtain a list of match locations. Step 608 involves performing a geometric matching algorithm to determine geometric features in the target image that correspond to the parent feature. In the assumed example, the method matches the template circle to all the circles in the target image and creates an initial list of matches. As shown in the example of FIG. 12, the method may find two matches, i.e., may find two instances of the parent feature in the target image.

In 608, the method may create and store match information data structures corresponding to each match. Each match information data structure may comprise information about the location of the match and the characteristics or parameters of the match. During the match phase, the method preferably maintains and updates a data structure comprising the parameters of each possible match. These parameters may include position, scale, orientation, etc.

In 608 the match that is performed uses geometric characteristics of the respective features. For example, where two circles are being matched, the matching may compare the radii of the circles and scale. Where two legs are being matched, the matching may examine the separation between the widths of the lines and the length of the lines. Other types of geometric pattern matching may be performed for different geometric features, as is known in the art.

In 610, for each match obtained, the method examines the next template child feature and determines if there is a corresponding (or matching) target child feature that is consistent with the given match. This may involve extracting geometric features in the target image that correspond to the respective next template child feature, and then performing matching operations.

If there is a corresponding target feature for a template child feature as determined in 612, then in 614 the given match is updated to reflect the additional information from the matching template—target child feature pair. For instance, such a match may be updated to reflect a refined position, scale or angle value. In the case of a circle as a parent feature, the initial matches may have unknown orientations (angles) and updating such a match with a child feature could provide orientation information.

Figure 13:
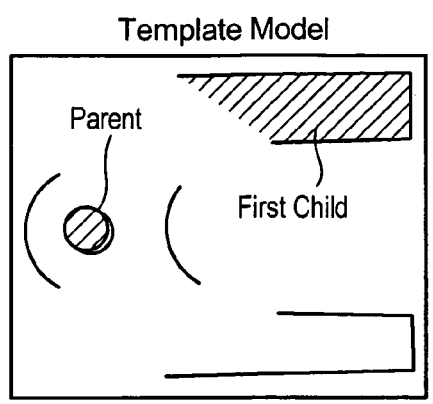
FIG. 13 illustrates a template model for the alignment shim where the parent feature is a circle and the first child feature is a leg.
Figure 14:
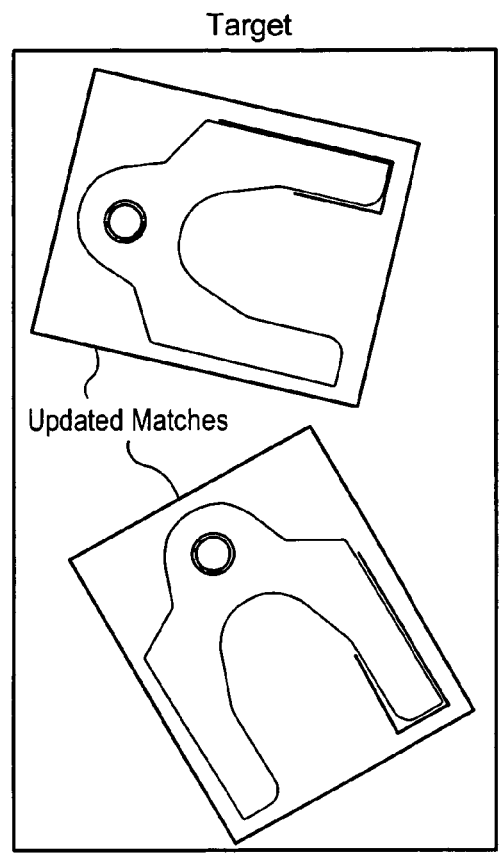
FIG. 14 illustrates an example of updated matches where a first child feature has been found in the proper spatial relationship from the parent feature, for each of the two instances of the parent feature.

For example, FIG. 13 shows the first template model where the parent feature is the circle and the first child feature is the leg, as shown. In the example of FIGS. 13 and 14, the method matches the upper template leg to all the legs in the inspection image. The method then determines if any of these feature correspondences can be used to update an existing match.

As shown in FIG. 14, in 610 the method may locate instances of the first child feature in each of the two existing matches (the top and bottom instances of the alignment shim in the target image). More particularly, FIG. 14 shows an example of updated matches where a first child feature has been found in the proper spatial relationship from the parent feature, for each of the two instances of the parent feature (circle). The information regarding location and orientation of the first child feature may be used to update the match information of each match. For example, in FIG. 12 only the parent features (the circles) have been located, and no orientation information is available, thus the rectangles in FIG. 12, which visually represent the match information, do not properly surround the instances in the target image. With the information gained from the location and orientation of the first child feature, the match information is updated as shown in FIG. 14. Thus the match data structure for each match can be updated with orientation information. This is visually illustrated in FIG. 14 by the "rectangles" being properly positioned over the match instances. Thus, if in 610 the method finds a match for a child feature in the target, the method in 614 updates the respective match data structure accordingly.

Figure 15:
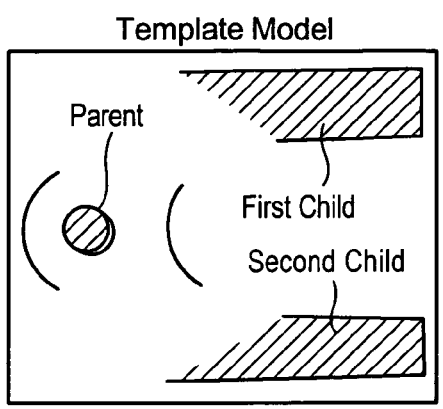
FIG. 15 illustrates a template model having a parent feature and first and second child features.
Figure 16:
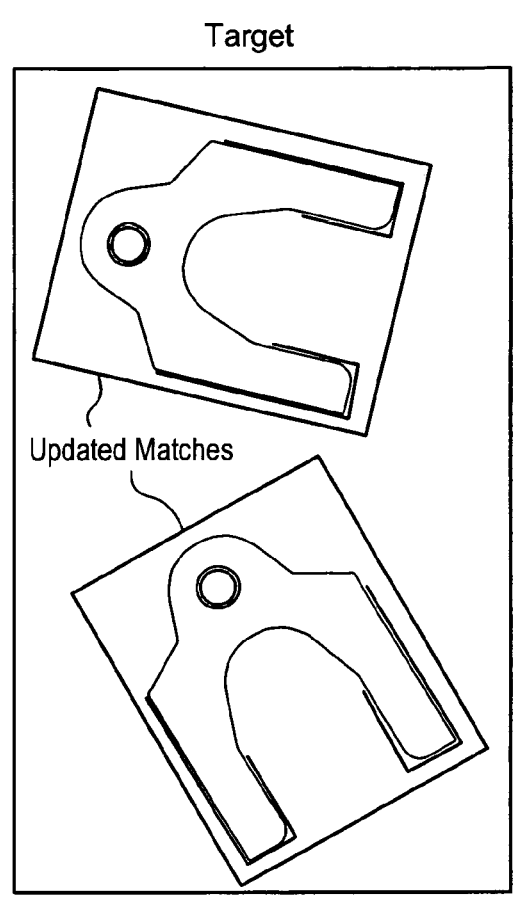
FIG. 16 illustrates location of the parent feature and first and second child features in the target image.

The method may repeat 610-614 one or more times for various child features in the feature relationship model. FIGS. 15 and 16 illustrate locating a second child match, which comprises the leg in the lower right of the template model. FIG. 15 shows the second child feature in the model, the leg in the lower right hand portion of the model. FIG. 16 shows location of the second child feature in the target image for each of the two matches of the parent and first child features that were previously found. When the second child feature is located in each of the two match instances, the match information for each match is updated again. For example, the orientation information may be updated somewhat to reflect a more proper orientation, as visually represented by the slightly adjusted rectangles in FIG. 16 as compared to FIG. 14.

The "Good" child features are used to update the match, which means that the method may actually change one or parameters of the match, such as position, scale, orientation, skew, etc. After one or more "Good" child features have been examined, the method may examine one or more "Bad" child features. In one embodiment, the bad features are not used to update any parameters of the match, but rather are used to improve the score of the match.

If no target child feature exists that matches the given template child feature and is consistent with the match under consideration, the match is not updated.

In 616, if the child feature match does not update any of the existing matches, then the method may select a new model, e.g., select a new parent feature which is the basis for a new model. Here the method may select a template child feature to become the new parent feature, which involves using a new model of which this template child feature is a parent feature. This may also involve creating a new match based on this template child feature being the new parent feature. Alternatively, the method may select a new model based on a new parent feature, e.g., a parent feature that has not yet been extracted or matched in the target figure. For example, the method may operate to select as the new parent feature the next strongest feature in the ordering of features, e.g., regardless of whether this next strongest feature has been previously extracted or matched.

Operation may then repeat as described above in 606-616 for the model corresponding to the new parent feature. If the new parent feature has not yet been extracted or matched, then this is performed in 606 and 608. Alternatively, if the new parent feature is a child feature from a prior model that has already been extracted and matched, then 606 and 608 do not need to be performed for this new parent feature.

The above process may iterate one or more times until all matches have been determined.

Figure 17:
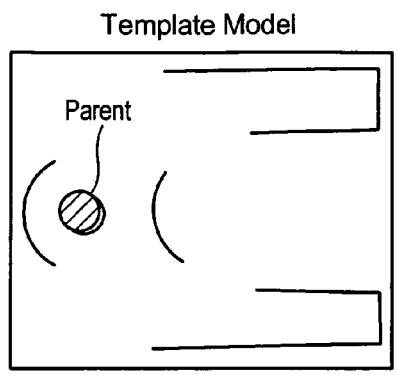
FIG. 17 shows a template model for an alignment shim, where the parent feature is a circle.
Figure 18:
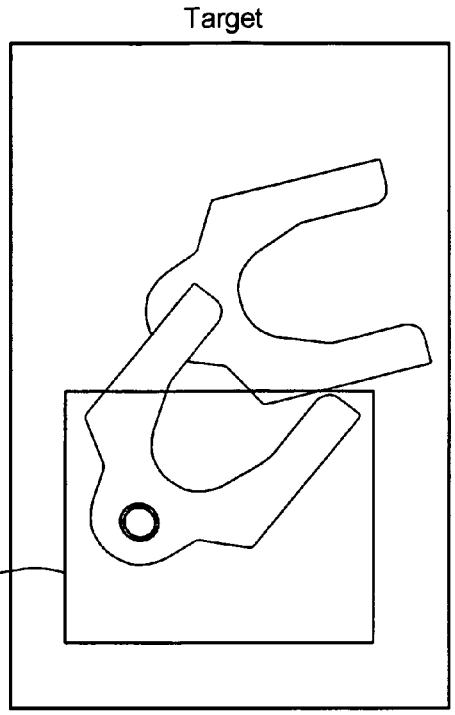
FIG. 18 shows an initial match in the target image where occlusion exists in the objects present, where a circle has been located in the lower instance of the alignment shim in the image, and the circle for the other (top) instance of the alignment shim is occluded.
Figure 19:
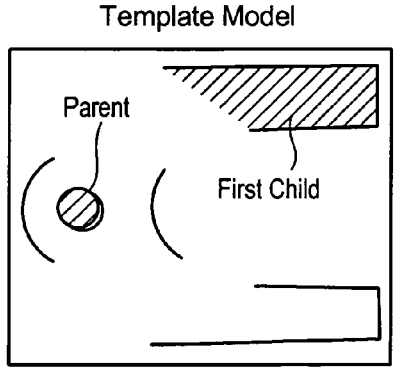
FIG. 19 shows a model including a parent feature and a first child feature, where the first child feature is the leg in the upper right hand portion of the image.
Figure 20:
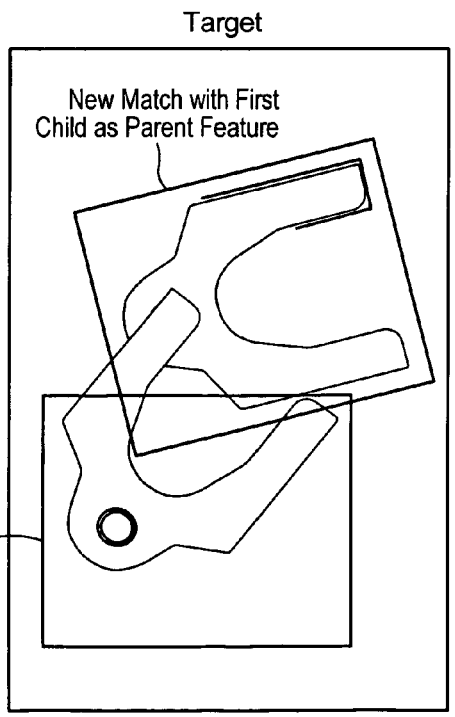
FIG. 20 shows the target image where the leg is found, but actually on a different instance of the alignment shim from where the parent circle was found.

FIGS. 17 and 18 show matching where there is occlusion in objects present in the target image. FIG. 17 shows a first template model, where the parent feature is the circle, as shown. FIG. 18 shows the initial match in the target image, where the circle has been located in the lower instance of the alignment shim in the image. Here note that the circle for the other (top) instance of the alignment shim is occluded. FIG. 19 shows the first child of the first template model, in this case the leg in the upper right hand portion of the image. FIG. 20 shows the target image where the leg is found, but actually on a different instance of the alignment shim. Here the method will determine that the child feature found in FIG. 20 does not correspond to the parent feature found in FIG. 18.

Referring to FIG. 20, in one embodiment, for this match where the first child feature found does not update the parent feature, the method may select the first child feature as the parent feature of a new model, which has a new set of child features. Thus, if a correspondence between a template and target feature pair does not update an existing match, the method may create a new match and begin using a new model. In the assumed example, the upper leg (the first child feature of the first model) becomes the root or parent of a new model and of this new match. The children used for this new model now are different from those used for the model in which the circle is the parent feature.

FIGS. 21 and 22 show an embodiment where, after the first child feature is determined to not update any matches, the method may then examine the second child feature. FIG.

21 shows the second child of the first template model, in this case the leg in the lower right hand portion of the image. FIG. 22 shows the updated matches for each of the lower and upper instances of the alignment shim in the target image. Here the method will determine that one instance of the second child feature corresponds to the parent feature circle, while the other instance does not.

As shown by 618, the method may repeat the above process (604-616) for a subset or all of the remaining "Strong" parent features, i.e., for models corresponding to these "Strong" parent features, until all matches are found. Thus the method may examine a plurality of different models having different feature relationship hierarchies in determining matches. The method may also select these models hierarchically, based on results obtained during the matching phase. In one embodiment, the match phase is able to learn which models produce the most accurate and/or most "speedy" results, and adaptively or heuristically use those models first.

After the method has been performed, the method may go through each match determined and compare the entire template with each of the matches in the target to determine a final score for each match. The method may use these final scores to remove any "false matches". For example, the method may select matches whose final scores are above a predetermined threshold.

Although the system and method of the present invention has been described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims.

We claim:

1. A computer readable memory medium storing program instructions for detecting patterns in an image, wherein the program instructions are executable to implement:
   in a learning phase,
      storing a template image in a memory medium;
      determining a plurality of geometric features present in the template image;
      creating a model for each of a plurality of respective parent features, wherein each model comprises a relationship tree from the respective parent feature to one or more other child features;
   in a matching phase,
      a) receiving a target image;
      b) extracting first geometric features from the target image that correspond to a first parent feature in a first model;
      c) matching the first parent feature to the first geometric features from the target image to determine a first one or more matches;
      d) extracting second geometric features from the target image that correspond to at least one child feature in the first model;
      e) matching the at least one child feature to the second geometric features from the target image;
      f) updating any of the first one or more matches in response to matching the at least one child feature to the second geometric features from the target image;
      (g) performing b)-f) for each of a plurality of models; and
   storing information regarding one or more matches in the target image.

2. The computer readable memory medium of claim 1, wherein the order of the child features is different for each of at least a subset of respective parent features.

3. The computer readable memory medium of claim 1, wherein at least one parent feature is a child feature in a model corresponding to another parent feature.

4. The computer readable memory medium of claim 1, wherein the program instructions are further executable to implement:
   performing d)-f) for each of a plurality of child features in the first model.

5. The computer readable memory medium of claim 1, wherein the program instructions are further executable to implement:
   if steps d) and/or e) do not find a geometric feature from the target image that matches a respective child feature, then selecting a new model based on a second different parent feature.

6. The computer readable memory medium of claim 5, where said selecting the new model comprises selecting a previously identified child feature of the first model as the second parent feature, wherein the second parent feature is the parent feature of the new model.

7. The computer readable memory medium of claim 5, where said selecting the new model comprises selecting a previously unidentified feature as the second parent feature, wherein the second parent feature is the parent feature of the new model.

8. The computer readable memory medium of claim 5, wherein in the target image an object of interest is at least partially occluded.

9. The computer readable memory medium of claim 1, wherein the program instructions are further executable to implement:
   in the learning phase, sorting the parent features into an order based on strength, wherein stronger parent features have a greater ability to distinguish and/or identify the template image.

10. The computer readable memory medium of claim 9, wherein the strength of the parent features is determined at least partially based on:
   1) the geometry of the feature;
   2) how well the feature was found in the image; and
   3) the size of the feature.

11. The computer readable memory medium of claim 9, wherein a first set of stronger features is used in updating one or more matches;
   wherein a second set of less stronger features is used in updating a score of one or more matches.

12. The computer readable memory medium of claim 1, wherein said matching in c) comprises, for each of one or more matches, storing match data in a respective data structure;
   wherein said updating the match in f) comprises, for each of one or more matches, updating the data in the respective data structure.

13. A method for detecting patterns in an image, the method comprising:
   in a learning phase,
      storing a template image in a memory medium;
      determining a plurality of geometric features present in the template image;
      creating a model for each of a plurality of respective parent features, wherein each model comprises a relationship tree from the respective parent feature to one or more other child features;
   in a matching phase, a) receiving a target image;
b) extracting first geometric features from the target image that correspond to a first parent feature in a first model;
c) matching the first parent feature to the first geometric features from the target image to determine a first one or more matches;
d) extracting second geometric features from the target image that correspond to at least one child feature in the first model;
e) matching the at least one child feature to the second geometric features from the target image;
f) updating any of the first one or more matches in response to matching the at least one child feature to the second geometric features from the target image;
performing b)-f) for each of a plurality of models.

14. The method of claim 13, wherein the order of the child features is different for each of at least a subset of respective parent features.

15. The method of claim 13, wherein at least one parent feature is a child feature in a model corresponding to another parent feature.

16. The method of claim 13, further comprising:
performing d)-f) for each of a plurality of child features in the first model.

17. The method of claim 13, further comprising:
If steps d) and/or e) do not find a geometric feature from the target image that matches a respective child feature, then selecting a new model based on a second different parent feature.

18. The method of claim 17, where said selecting the new model comprises selecting a previously identified child feature of the first model as the second parent feature, wherein the second parent feature is the parent feature of the new model.

19. The method of claim 17, where said selecting the new model comprises selecting a previously unidentified feature as the second parent feature, wherein the second parent feature is the parent feature of the new model.

20. The method of claim 17, wherein in the target image an object of interest is at least partially occluded.

21. The method of claim 13, further comprising:

in the learning phase, sorting the parent features into an order based on strength, wherein stronger parent features have a greater ability to distinguish and/or identify the template image.

22. The method of claim 21, wherein the strength of the parent features is determined at least partially based on:

1) the geometry of the feature;
2) how well the feature was found in the image; and
3) the size of the feature.

23. The method of claim 21,
wherein a first set of stronger features is used in updating one or more matches;
wherein a second set of less stronger features is used in updating a score of one or more matches.

24. The method of claim 13,
wherein said matching in c) comprises, for each of one or more matches, storing match data in a respective data structure;
wherein said updating the match in f) comprises, for each of one or more matches, updating the data in the respective data structure.

* * * * *